United States Patent
Emerson et al.

(10) Patent No.: US 7,931,928 B2
(45) Date of Patent: Apr. 26, 2011

(54) PELLET DRYING PROCESS

(75) Inventors: David Brian Emerson, Coppell, TX (US); Karoline Marie Kensinger Russell, McKinney, TX (US); Thomas Anthony Trezza, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 463 days.

(21) Appl. No.: 12/102,683

(22) Filed: Apr. 14, 2008

(65) Prior Publication Data
US 2009/0258113 A1   Oct. 15, 2009

(51) Int. Cl.
*A23L 1/18* (2006.01)

(52) U.S. Cl. ........ 426/465; 426/496; 426/516; 426/520; 426/808

(58) Field of Classification Search .......... 426/443, 426/465, 466, 496, 512, 516, 520, 808
See application file for complete search history.

(56) References Cited

U.S. PATENT DOCUMENTS

| | | | |
|---|---|---|---|
| 3,150,978 A | 9/1964 | Campfield | |
| 3,190,755 A * | 6/1965 | Peden, Jr. | 426/440 |
| 3,332,781 A * | 7/1967 | Benson et al. | 426/446 |
| 3,502,479 A | 3/1970 | Singer et al. | |
| 3,615,677 A | 10/1971 | Scharschmidt et al. | |
| 3,718,480 A | 2/1973 | Tremblay et al. | |
| 3,800,050 A | 3/1974 | Popel | |
| 4,251,551 A | 2/1981 | Van Hulle et al. | |
| 4,409,250 A | 10/1983 | Van Hulle et al. | |
| 4,423,082 A | 12/1983 | Bauernfeind et al. | |
| 4,540,592 A | 9/1985 | Myer et al. | |
| 4,828,856 A | 5/1989 | Willard | |
| 4,844,937 A * | 7/1989 | Wilkinson et al. | 426/559 |
| 4,873,110 A | 10/1989 | Short et al. | |
| 4,931,303 A | 6/1990 | Holm et al. | |
| 4,950,492 A | 8/1990 | Shachat et al. | |
| 4,957,755 A | 9/1990 | Causey | |
| 4,965,081 A | 10/1990 | Lazarus | |
| 4,987,280 A | 1/1991 | Kanafani et al. | |
| 4,990,348 A | 2/1991 | Spratt et al. | |
| 4,994,295 A | 2/1991 | Holm et al. | |
| 5,080,914 A | 1/1992 | Birch et al. | |
| 5,102,679 A * | 4/1992 | Whalen | 426/549 |
| 5,108,772 A | 4/1992 | Wilbur | |
| 5,124,161 A | 6/1992 | van Lengerich et al. | |
| 5,165,950 A * | 11/1992 | Boehmer et al. | 426/559 |
| 5,817,355 A | 10/1998 | Zukerman et al. | |
| 5,942,273 A | 8/1999 | Mochizuki et al. | |
| 6,083,552 A | 7/2000 | Kershman et al. | |

(Continued)

*Primary Examiner* — Drew E Becker
(74) *Attorney, Agent, or Firm* — Colin P. Cahoon; Amanda K. Jenkins; Carstens & Cahoon, LLP

(57) ABSTRACT

A method for making an expandable half-product or pellet suitable for cooking by microwave oven (or other method such as frying) that results in a non-uniform, random design, while having a distinct pattern or style. The half product design is achieved by inducing stress cracks in the half product. The stress cracks are created by a controlled drying process whereby extruded half-products are first case hardened to create an outer skin that requires an internal build-up of pressure to penetrate. After creation of the outer skin, by drying in an oven or in ambient air, the half-product is heated to permit the vapor pressure of the moisture inside the half-product to break through the outer skin and escape. Such escape points induce stress cracks in random places in the half-product. The general pattern of the stress cracks can be varied by manipulation of the time-temperature profile of the case hardening and stress cracking steps.

12 Claims, 1 Drawing Sheet

U.S. PATENT DOCUMENTS

| | | |
|---|---|---|
| 6,171,631 B1 | 1/2001 | Willoughby et al. |
| 6,291,008 B1 | 9/2001 | Robie et al. |
| 6,319,534 B1 | 11/2001 | Willoughby et al. |
| 6,432,463 B1 * | 8/2002 | Bhaskar et al. ............... 426/496 |
| 6,461,660 B2 | 10/2002 | Morii et al. |
| 6,645,541 B2 | 11/2003 | Morii et al. |
| 6,746,702 B1 * | 6/2004 | Robie ........................... 426/241 |
| 2001/0051198 A1 | 12/2001 | Robie et al. |
| 2002/0182291 A1 | 12/2002 | Renini et al. |
| 2003/0068420 A1 | 4/2003 | Morii et al. |
| 2004/0028781 A1 | 2/2004 | Duran Vila et al. |
| 2004/0035859 A1 | 2/2004 | Childress et al. |
| 2004/0105930 A1 | 6/2004 | Morii et al. |
| 2009/0017169 A1 * | 1/2009 | Assaad et al. ................... 426/89 |

* cited by examiner

PELLET DRYING PROCESS

BACKGROUND OF THE INVENTION

1. Technical Field

The present invention relates to expandable food products and more specifically to a process for drying a pellet or half-product to induce stress cracks and non-uniformity in size and shape in microwave snacks.

2. Description of Related Art

Microwave ovens have become common devices used to cook and reheat food products and 95% of all households in the United States own at least one microwave oven. Consequently, there is a large market for microwaveable foods including microwaveable snack foods. One such product is microwave popcorn. Generally, such popcorn products comprise an expandable paper bag containing a charge or matrix of popcorn, fat and salt. A wide variety of products have been developed, including improvements in bag design and variations in salt and fat levels. Flavored fat popcorn products have even been developed, e.g., butter flavored.

The widespread household use of microwave ovens has inspired efforts to provide snack foods suitable for microwave ovens. To this end, the art includes products which comprise pellets which puff upon microwave heating, in substitution for popcorn. Such puffable pieces are generally referred to as "half products" in the puffed snack food art. In particular, U.S. Pat. No. 4,251,551 disclosed such a food product. The product therein described comprises a plurality of puffable pellets matrixed in a flavored fat coating. Upon microwave heating, the pellet gradually expands to form puffed pieces which are covered with a flavored coating. According to the '551 patent, the half products can be made by extruding a dough into small pellets and drying the pellets to a 5% to 15% moisture range. Like many half-product patents, the '551 patent teaches that the drying process must be controlled and warns that if the moisture loss occurs only from the outer surface of the pellets while the inner portion of the pellets retains moisture, then the total moisture of the pellets may be within the required 5% to 15% range, but will not puff or expand properly during puffing. The patent indicates that such poor puffing results from the starch material in the outer portions of the pellets having little or no moisture with which to expand during the microwave puffing step. Hence, the '551 patent teaches that a convection drying operation, carried out at about 70° F. to about 200° F. with a relative humidity of 35% can dry the pellets and the moisture distribution within the pellets will be proper. Similarly, U.S. Pat. No. 4,844,937 teaches that a drying step can be used to remove the surface moisture from the formed pieces so that the pieces are non-sticky, but cautions against case hardening.

While the various microwave popcorn and half products are popular, it would be desirable to have even greater variety in texture, flavors and to have flavored textured products that correspond to specific flavors. Yet it would be desirable to mimic the controlled randomness look of popcorn. For example, while each piece of popcorn has a different shape, there is a clear pattern or style to the look of popcorn. However, there are variables such as size constraints that limit or control the amount of randomness imparted. Yet, other than color, there is no way for a consumer to differentiate a butter flavored piece of popcorn firm a cheese flavored piece of popcorn.

One problem in using microwave half-products to mimic popcorn is that because microwave half-products are typically extruded from a die, the expanded or puffed half-products are typically uniform in shape and therefore do not have any such "controlled randomness" aspects. Half-products, therefore fail to provide a satisfactory alternative to microwave popcorn. Consequently, a need exists for a microwaveable half-product snack food having non-uniform shapes, yet a distinct style. Further, a need exists for a process to induce stress cracks in such snack food to induce random shapes in the snack food.

SUMMARY OF THE INVENTION

Dry ingredients comprising starches, oils, and/or flavorings are mixed together in a hopper. In an optional pre-conditioning step, steam and/or liquid water is added to the dry mix. The mixture is extruded and the extrudate is cut into pellets upon exiting the extruder. The pellets are case hardened to create an outside skin layer. Next, the pellets are heated such that portions of the outer skin layer are breached by the expanding vapors inside the pellet and thereby stress cracks the pellet. The pellets can then be dried to a moisture content of between about 5% and about 15%. Additional topical seasoning, topical oil, and salt can be added to the dried pellets, and the finished half-product is packaged. The packaged, finished half-product is designed to puff and expand non-uniformly upon application of heat from hot oil, a microwave, or hot air. The above as well as additional features and advantages of the present invention will become apparent in the following written description.

BRIEF DESCRIPTION OF THE DRAWINGS

The novel features believed characteristic of the invention are set forth in the appended claims. The invention itself, however, as well as a preferred mode of use, farther objectives and advantages thereof, will be best understood by reference to the following detailed description of illustrative embodiments when read in conjunction with the accompanying drawings, wherein:

DETAILED DESCRIPTION

Figure 1:
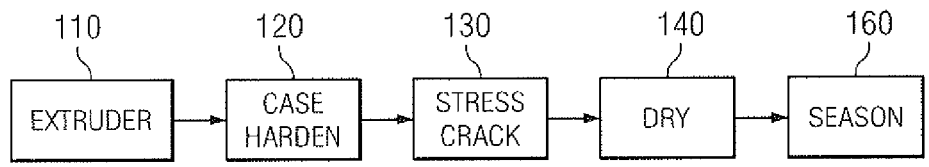
FIG. 1 is a schematic representation of the overall steps of the new process.

An embodiment of the innovative invention will now be described with reference to FIG. 1. Dry ingredients comprising native potato starch, native tapioca starch, potato flakes, pre-gelatinized, waxy maize starch, flour salt, fully hydrogenated soybean oil, and flavoring are mixed together in a hopper. Other dough compositions can be used including those disclosed in U.S. Pat. No. 4,409,250 and references to dough compositions disclosed therein. In an optional pre-conditioning step, steam at a pressure of at least 10 psig, and liquid water is added to the dry mix. The mixture is extruded 110 at temperatures between about 130° F. to about 190° F. and pressures between about 300 and about 1,500 psig. The extrudate comprises a moisture content of between about 25% and about 35% and more preferably between about 28% and about 32% upon exit from the extruder. The extrudate is cut into pellets upon exiting the extruder and the pellets are then case hardened 120. As used herein, case hardened refers to a hardening of the outer peripheral surface or outer skin of the pellet such that a build-up of internal pressure is required for moisture to escape. When such moisture is released, a crack in the pellet is formed.

The purpose of the case hardening 120 is to form an outer skin layer and raise the vapor pressure required to penetrate and crack the skin layer. Any case hardening time-temperature profile that can achieve this objective can be used including drying in ambient or heated air for the requisite amount of time. Next, the pellets are heated and thereby stress cracked 130 in a manner such that portions of the outer skin layer are breached by the expanding vapors inside the pellet. The pellets are then dried 140 to an overall moisture content of between about 5% to about 15% and more preferably about 11% to about 14%. Additional topical seasoning, topical oil, and salt 160 can be added to the dried pellets, and the finished half-product is packaged. The packaged, finished half-product is designed to puff and expand upon application of heat from hot oil, a microwave, or hot air.

Figure 2:
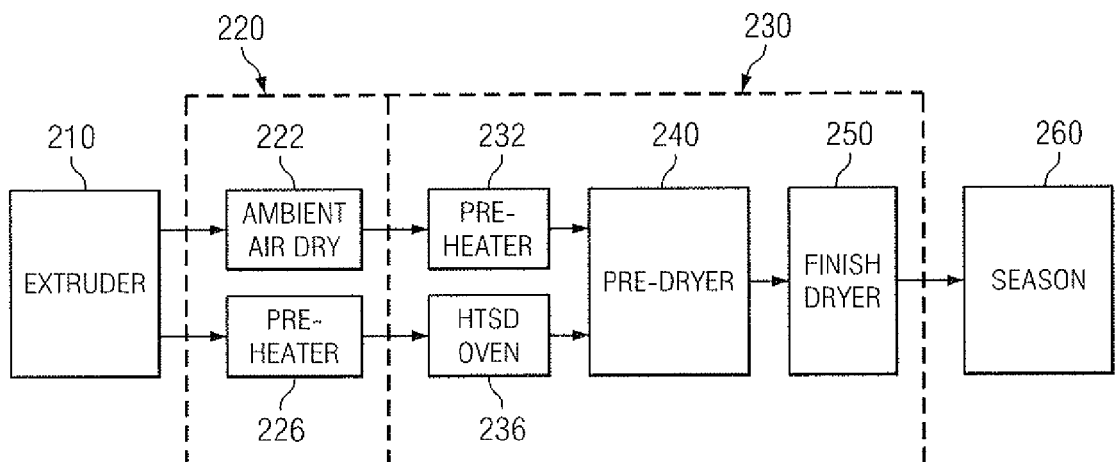
FIG. 2 is a schematic representation depicting two separate embodiments of the present invention.

FIG. 2 is a schematic representation depicting two separate embodiments of the present invention. In both embodiments, dough is first extruded in a multi-zone barrel twin screw extruder 210 at temperatures between about 130° F. to about 190° F. and pressures between about 300 and about 1,500 psig and cut into pellets. These pellets are then case hardened with a case hardening time-temperature profile. As used herein, a case hardening time-temperature profile is any time-temperature profile which results in a case-hardened pellet. The case hardened pellet comprises a moisture gradient between the outer skin of the pellet and the inside of the pellet. In one embodiment, the outer skin comprises a moisture content of less than about 4% by weight.

In one embodiment, the pellets are case hardened 220 by ambient air 222. This can occur by moving the pellets along a conveyor belt. The time and temperature required for the requisite case hardening will be dependent upon several factors including, but not limited to the ambient air temperature, the amount of the time the pellets are exposed to the ambient air, the surface area to volume ratio of the pellet, the relative humidity of the ambient air, and shape of the pellet. Consequently, some trial and error may be required to determine the optimum amount of time required for case hardening.

In one embodiment, sufficient case hardening was achieved for a relatively spherically shaped pellet extruded from a temperature of between about 170° F. and about 200° F. having a diameter of about ⅛" exposed to ambient air from about 60° F. to about 100° F. and more preferably from about 70° F. to about 80° F. for between about 5 and about 15 minutes. In one embodiment, the overall moisture content dropped from about 30% to about 26% by weight after the case hardening 220 step.

Once the pellets are case-hardened, or have an outer skin, the outer skin can be penetrated by stress cracking 230 with a stress cracking time-temperature profile. As used herein, a stress cracking time-temperature profile is any time-temperature profile which results in a crack in a portion of the case hardened pellet, but remains an expandable half-product. In one embodiment, stress cracking 230 can be achieved in a pre-heater 232. A single pass pre-heater such as the Enersyst M970101, available from Enersyst Corporation in Dallas, Tex. can be used. In an alternative embodiment, a low temperature tumbler such as the Cantrell Modular Rotary Oven, Model MRO-18-2A, available from A.C. Horn Inc. in Dallas, Tex. can be used. In one embodiment, the pellets are placed in the single pass pre-heater having a relative humidity of between about 5% and about 15% for between about 2 to about 30 minutes, at a temperature of between about 150° F. to about 300° F. Such ranges are provided for purposes of illustration and not limitation. Any stress cracking time-temperature profile can be used in the pre-heater 232 that provides the requisite stress cracking 230. Because of the outer skin layer, when the pellets are exposed to the pre-heater 232, the outer skin prevents the moisture within the pellet from escaping throughout the periphery of the outer surface of the pellet. Consequently, internal pressure within the pellet builds until the pressure is sufficient to breach one or more weak points on the outer skin. Steam and/or moisture can then escape through each weak point thereby creating a stress crack. The pellets can then be dried in one or more multi-stage dryers. In one embodiment, the pellets are routed to a multi-pass pre-dryer 240 having a relative humidity of about 5% to about 15% for about 30 to about 60 minutes at a temperature of about 150° F. to about 200° F. A multi-pass pre-heater such as the APV Enerjet Oven, Model 5400/24/1, available from Invensys APV in Getzville, N.Y. can be used. The pellets can then be routed to a multi-pass finish dryer 250 having a relative humidity of about 10% to about 40% for about 30 to about 90 minutes at a temperature of about 125° F. to about 210° F. A multi-pass finish dryer 250, such as the Proctor K95135, available from Proctor & Schwartz, Inc. in Horsham, Pa. can be used.

It should be pointed out that the case-hardening time-temperature profile and stress cracking time-temperature profile can be varied to achieve the goals of the invention. For example, in one embodiment, the pellets can be case hardened 220 by ambient air 222 and further case hardened by a pre-heater 232 by operating the pre-heater at relatively lower temperatures and/or placing the pellet in the pre-heater for a relatively shorter dwell time, as illustrated by Example 4 below. In such scenario, the stress cracking can then occur concurrently with the drying step and in the unit operations defined as the pre-dryer 240 and finish dryer 250 by using relatively higher temperatures and/or relatively higher dwell times in the pre-dryer 240 and/or finish dryer 250. For example, in one embodiment, the pellets are case hardened 220 by ambient air for about 10 to about 15 minutes, further case hardened in a pre-heater having a relative humidity of between about 5% and about 15% for between about 5 to about 30 minutes, at a temperature of between about 150° F. to about 200° F., and then stress cracked in a multi-pass pre-dryer 240 operating at about 200° F. to about 300° F. for about 10 to about 60 minutes and then dried in a finish dryer 250 having a relative humidity of about 10% to about 40% for about 30 to about 90 minutes at a temperature of about 125° F. to about 210° F. Consequently, although specific unit operations are shown in the block diagram in FIG. 2, those skilled in the art will recognize that such operations can be manipulated and the objective of providing a case hardened pellet that is then stress cracked can still be achieved. For example, although a pre-dryer 240 and a finish dryer 250 are depicted, a single multi-pass dryer can be used.

Topical seasoning, topical oil, and salt 260 can be added to the dried pellets, and the finished half-product can be packaged for consumer use. The packaged, finished half-product having stress cracks is designed to puff and expand in a non-uniform way upon application of heat from hot oil, a microwave, or hot air.

Figure 3A:
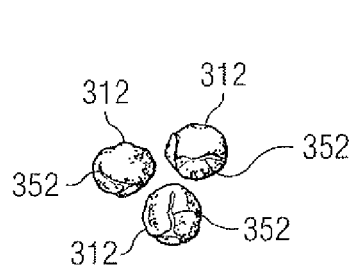
FIG. 3a is a perspective view of an unexpanded half-product having stress cracks induced by a method in accordance with one embodiment of the present invention.

FIG. 3a is a perspective view of an unexpanded half-product or pellet having stress cracks in accordance with one embodiment of the present invention. The unexpanded half-products 312 comprise induced stress cracks 352 produced by a method in accordance with one embodiment of the present invention. It should be noted that the stress cracking time-temperature profile can be manipulated to achieve the level of stress cracking desired. For example, if a greater number of smaller stress cracks are desired, then less case hardening can be provided by utilizing relatively shorter case hardening dwell times and/or lower temperatures. Conversely, if a fewer number of larger stress cracks are desired, then relatively more case hardening can be provided by utilizing relatively longer case hardening dwell times and/or higher temperatures.

Figure 3B:
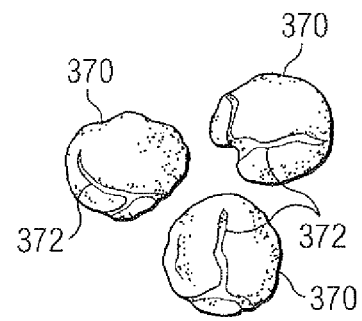
FIG. 3b is a perspective view of an expanded half-product having stress cracks induced by a method in accordance with one embodiment of the present invention.

FIG. 3b is a perspective view of an expanded half-product or pellet having stress cracks in accordance with one embodiment of the present invention. The expansion from exposure to heat causes the half-product 370 and its stress cracks 372 to concomitantly expand, but at different rates. The stress cracks 372 expand at a different rate than the rest of the half-product because moisture within the half-product has a preferred pathway of escape, namely through the existing stress cracks 372. Stated differently, in areas where the case hardened outside skin is intact, the moisture cannot escape as rapidly as moisture can escape in areas near the stress cracks 372. Consequently, there is relatively more expansion in the portion of the pellet where the outside skin is intact. Where there is easy escape of moisture in areas, such as through the un-cooked stress cracks, there is less expansion as moisture can easily escape through the stress crack resulting in less build-up of pressure. The stress cracks therefore allow the pellet to expand non-uniformly as the intact surfaces and stress crack surfaces expand independently of each other.

Referring back to FIG. 2, in an alternative embodiment, after the dough is extruded, it is case hardened 220 by a pre-heater 226. In one embodiment, the pre-heater 226 has a relative humidity of between about 5% and about 15% for between about 5 to about 30 minutes, at a temperature of between about 150° F. to about 200° F. Such ranges are provided for purposes of illustration and not limitation. As stated above, any set of variables can be used in the pre-heater 226 that provides the requisite case hardening 220. The same pre-heater 226 as described above referenced with numeral 232 for the stress cracking can be used. It should be pointed out that case hardening 220 may occur at a faster rate in the lower temperature ambient air dry 222 embodiment, described above, than in the elevated temperature of a pre-heater 226 embodiment because of the greater temperature differential that exists between the pellet leaving the extruder and the ambient air. The pellet can cool quicker in ambient air permitting excess moisture to flash from the surface.

Next, the pellets are routed to a high temperature, short dwell time (HTSD) oven 236 having a temperature of about 200° F. to about 400° F. for a dwell time of between about 30 seconds and about 5 minutes. Such ranges are provided for purposes of illustration and not limitation. The above range is merely provided as an example of a time-temperature profile that can be used. For example, if the pellets placed in the oven 236 have a dwell time of less than about 30 seconds in an oven having a temperature of less than about 200° F., the internal pressure may not raise enough to sufficiently channel moisture through the case hardened outer skin. Similarly, if the pellets placed in the oven 236 have a dwell time of more than about 5 minutes in an oven having a temperature of more than about 400° F., the pellets can begin to expand, which can limit the expansion experienced by the half-product when later heated by a consumer.

The pellets can then be dried in one or more multi-stage dryers. In one embodiment, the pellets are routed to a multi-pass pre-dryer 240 having a relative humidity of about 5% to about 15% for about 30 to about 60 minutes at a temperature of about 150° F. to about 200° F. In that embodiment, the pellets are then routed to a multi-pass finish dryer 250 having a relative humidity of about 20% to about 30% for about 30 to about 60 minutes at a temperature of about 175° F. to about 210° F. The pellets are dried to an overall moisture content of between about 11% to about 14% by weight. The pellets can then be seasoned 260 and packaged for consumer use. Additional topical seasoning, topical oil, and salt can be added to the dried pellets, and the finished half-product is packaged. The packaged, finished half-product or pellet having stress cracks is designed to puff and expand in a non-uniform way upon application of heat from hot oil, a microwave, or hot air.

The following Examples are presented to further illustrate making and using the compositions of this invention. These Examples are not to be construed as limiting.

EXAMPLE 1

A dough was extruded and face cut into ⅛-inch diameter pellets. The pellets were case hardened in ambient air having a relatively humidity of about 20% to about 35% and at about 70° F. to about 80° F. for about 10 minutes. The air dried and case hardened pellets were then stress-cracked by a pre-heater and exposed for 6 minutes to oven air having a temperature of about 170° F. and a relative humidity of about 20% to about 40%. The pellets were again air dried in ambient air having a relatively humidity of about 20% to about 35% and at about 70° F. to about 80° F. for about 10 minutes. Next the pellets were dried in a multi-pass pre-dryer/finish dryer. The dryer operated in 3 zones—a first zone had an oven temperature of about 150° F. and a relative humidity of about 10% to about 15%. The second zone had an oven temperature of about 135° F. and a relative humidity of about 25% and the third zone had an oven temperature of about 125° F. and had a relatively humidity of about 40%. The pellets were in the multi-zone oven for a total of about 90 minutes.

EXAMPLE 2

A dough was extruded and face cut into ⅛-inch diameter pellets. The pellets were case hardened in a pre-heater having a relatively humidity of about 20% to about 40% and an oven temperature of about 170° F. about 6 minutes. The pellets were then stress cracked in HTSD oven operating at an oven temperature of about 300° F. for about 3 minutes. Next the pellets were dried in a multi-pass pre-dryer/finish dryer. The dryer operated in 3 zones—a first zone had an oven temperature of about 150° F. and a relative humidity of about 10% to about 15%. The second zone had an oven temperature of about 135° F. and a relative humidity of about 25% and the third zone had an oven temperature of about 125° F. and had a relatively humidity of about 40%. The pellets were in the multi-zone oven for a total of about 90 minutes.

EXAMPLE 3

A dough was extruded and face cut into ⅛-inch diameter pellets. The pellets were case hardened in a pre-heater having a relatively humidity of 20% to about 40% and an oven temperature of about 200° F. about 6 minutes. The pellets were then stress cracked in an HTSD oven operating at an oven temperature of about 300° F. for about 3 minutes. The pellets were again air dried in ambient air having a relatively humidity of about 20% to about 35% and at about 70° F. to about 80° F. for about 10 minutes. Next the pellets were dried in a multi-pass pre-dryer/finish dryer. The dryer operated in 3 zones—a first zone had an oven temperature of about 150° F. and a relative humidity of about 10% to about 15%. The second zone had an oven temperature of about 135° F. and a relative humidity of about 25% and the third zone had an oven temperature of about 125° F. and had a relatively humidity of about 40%. The pellets were in the multi-zone oven for a total of about 90 minutes.

EXAMPLE 4

A dough was extruded and face cut into ⅛-inch diameter pellets. The pellets were case hardened in a HTSD oven operating at an oven temperature of 400° F. for about 1 minute. Next the pellets were stress cracked and dried in a multi-pass pre-dryer/finish dryer. The dryer operated in 3 zones—a first zone had an oven temperature of about 150° F. and a relative humidity of about 10% to about 15%. The second zone had an oven temperature of about 135° F. and a relative humidity of about 25% and the third zone had an oven temperature of about 125° F. and had a relatively humidity of about 40%. The pellets were in the multi-zone oven for a total of about 90 minutes.

The instant invention provides several advantages over the prior art. First, a pellet or half-product having stress cracks is provided. Thus, when the half product is heated in a microwave by a consumer, the half-product expands non-uniformly and thereby resembles a controlled randomness, in a way reminiscent of microwave popcorn, more than a non-stressed cracked half product. Second, the invention provides a way for a line of snack food half products having a distinct style that corresponds to a specific flavor. For example, a butter flavored half product can be extruded from a die having a first shape and can have induced stress cracking from a first case-hardening and/or stress cracking time-temperature profile and a cheese flavored half product can be extruded from a die having a second shape and a can have induced stress cracking from a second case hardening and/or stress cracking time-temperature profile. Further, although each of the butter flavored half products will be non-uniform, they will have a first distinct pattern or style and the cheese flavored half products will have a second distinct pattern or style. The present invention can thereby provide a consumer with a variety of flavors and distinct patterns that consumers can come to identify with those flavors. Such products are desirable because they provide excellent product recognition. Hence, the present invention provides a way for a new product line that can not only compete with microwave popcorn as a snack food, but can provide a greater variety of distinct patterns or styles.

While the invention has been particularly shown and described with reference to a preferred embodiment, it will be understood by those skilled in the art that various changes in form and detail may be made therein without departing from the spirit and scope of the invention.

What is claimed is:

1. A method of inducing stress cracks in an expandable pellet, said method comprising the steps of:
    extruding a dough into a pellet having an outer surface;
    case hardening said outer surface with a case-hardening time-temperature profile to create an outer skin; and
    cracking said outer skin with a stress cracking time-temperature profile,
    wherein said stress cracking time-temperature profile is different than said case hardening time-temperature profile.

2. The method of claim 1, wherein said case hardening time-temperature profile comprises exposing said pellets to ambient air having a temperature of between about 60° F. and about 100° F. for between about 5 minutes and about 15 minutes.

3. The method of claim 1, wherein said case hardening time-temperature profile comprises exposing said pellets to a temperature of between about 150° F. and about 200° F. for between about 5 minutes and about 15 minutes.

4. The method of claim 1, wherein said stress cracking time-temperature profile comprises exposing said pellets to a temperature of between about 200° F. and about 400° F. for between about 30 seconds and about 5 minutes.

5. The method of claim 1, wherein said stress cracking time-temperature profile comprises exposing said pellets to a temperature of between about 200° F. and about 300° F. for between about 10 minutes and about 60 minutes.

6. The method of claim 1 wherein said stress cracking occurs concurrently with a drying step, wherein said drying step occurs for between about 30 and about 90 minutes in a multi-zone oven having oven temperatures of between about 120° F. and about 200° F.

7. A method for making non-uniform pellets by affecting the moisture release, said method comprising the steps of:
    extruding a dough into a pellet having an outer surface;
    case hardening said outer surface with a first moisture release rate to create an outer skin; and
    cracking said outer skin with a second moisture release rate,
    wherein said second moisture release rate is different than said first moisture release rate.

8. The method of claim 7, wherein said first moisture release rate occurs from exposing said pellets to ambient air having a temperature of between about 60° F. and about 100° F. for between about 5 minutes and about 15 minutes.

9. The method of claim 7, wherein said first moisture release rate occurs from exposing said pellets to a temperature of between about 150° F. and about 200° F. for between about 5 minutes and about 15 minutes.

10. The method of claim 7, wherein said second moisture release rate occurs from exposing said pellets to a temperature of between about 200° F. and about 400° F. for between about 30 seconds and about 5 minutes.

11. The method of claim 7, wherein said second moisture release rate occurs exposing said pellets to a temperature of between about 200° F. and about 300° F. for between about 10 minutes and about 60 minutes.

12. The method of claim 7, wherein a moisture gradient after said case hardening whereby said moisture in said outer skin comprises less than about 4% by weight.

* * * * *